US010823132B2

(12) United States Patent
Mesinger et al.

(10) Patent No.: US 10,823,132 B2
(45) Date of Patent: Nov. 3, 2020

(54) HYDRAULIC-PNEUMATIC ENERGY STORAGE AND RECOVERY SYSTEM

(71) Applicants: Jeshoa Mesinger, Caesarea (IL); Or Yogev, Gedera (IL)

(72) Inventors: Jeshoa Mesinger, Caesarea (IL); Or Yogev, Gedera (IL)

( * ) Notice: Subject to any disclaimer, the term of this patent is extended or adjusted under 35 U.S.C. 154(b) by 0 days.

(21) Appl. No.: 16/340,147

(22) PCT Filed: Oct. 9, 2017

(86) PCT No.: PCT/IL2017/051131
§ 371 (c)(1),
(2) Date: Apr. 8, 2019

(87) PCT Pub. No.: WO2018/069925
PCT Pub. Date: Apr. 19, 2018

(65) Prior Publication Data
US 2019/0242357 A1 Aug. 8, 2019

Related U.S. Application Data (60) Provisional application No. 62/406,001, filed on Oct. 10, 2016.

(51) Int. Cl.
*F03B 13/06* (2006.01)
*F03B 17/00* (2006.01)

(52) U.S. Cl.
CPC .............. *F03B 13/06* (2013.01); *F03B 17/005* (2013.01); *F05B 2260/42* (2013.01); *Y02E 10/20* (2013.01); *Y02E 60/16* (2013.01)

(58) Field of Classification Search
CPC ...... F03B 11/004; F03B 11/002; F03B 17/005

USPC .............................................. 415/46
See application file for complete search history.

(56) References Cited

U.S. PATENT DOCUMENTS

| 3,810,717 | A | * | 5/1974 | Rakcevic | ............... F03B 13/06 |
|---|---|---|---|---|---|
| | | | | | 417/323 |
| 7,579,700 | B1 | | 8/2009 | Meller | |
| 9,752,452 | B2 | * | 9/2017 | Hoose, Jr. | ................ F03G 7/00 |

(Continued)

FOREIGN PATENT DOCUMENTS

| JP | H11343957 | 12/1999 |
|---|---|---|
| WO | 2014079410 | 5/2014 |
| WO | 2015043747 | 4/2015 |

OTHER PUBLICATIONS

WO 2014/079410 machine translation to English from espacenet (Year: 2014).*

*Primary Examiner* — Abiy Teka
*Assistant Examiner* — Michael Quandt (57) ABSTRACT

A hydraulic-pneumatic energy storage and recovery system, which comprises first and second sealed containers within each of which a volume of liquid is introducible and from which the introduced liquid is pneumatically propellable; a turbine interposed between the first and second containers and coupled with a generator, to produce power when caused to be rotated by the pneumatically propelled liquid; and collection-delivery apparatus located externally to the first and second containers, for collecting energy-depleted liquid gravitating from the turbine and for delivering the collected liquid to one of the first and second containers, to be used in subsequent energy recovery cycles.

18 Claims, 10 Drawing Sheets

(56) References Cited

U.S. PATENT DOCUMENTS

2011/0288688 A1\* 11/2011 Lehan .................. H02J 15/006
                                                                              700/282

\* cited by examiner

HYDRAULIC-PNEUMATIC ENERGY STORAGE AND RECOVERY SYSTEM

FIELD OF THE INVENTION

The present invention relates to the field of sustainable energy systems. More particularly, the invention relates to a hydraulic-pneumatic energy storage and recovery system.

BACKGROUND OF THE INVENTION

Many fluid based energy storage and recovery systems have been known from the prior art.

One type is a pumped storage system, often referred to as hydropower plant. In a hydropower plant, water is stored in an upper reservoir, and is released gravitationally during periods of high electricity demand to a lower reservoir whereat a turbine is deployed to generate power. During low-cost off-peak hours when there is less demand for electricity, the water is recycled by being pumped back to the upper reservoir from the lower reservoir.

In order for these pumped storage systems to be economically viable, however, large scale hydropower plants need to be erected. Such power levels are able to be achieved only when the differential height along which the stored water has to be delivered gravitationally, requiring high capital costs to build retaining walls for the reservoirs and pumping systems, as well as significant operating costs for pumping the delivered water back to the upper reservoir that reduce the profitability of the pumped storage system.

Another drawback associated with hydropower plants is the high rate of water evaporation from both the upper and lower reservoirs. Also, location-specific hydropower plants can be erected only at very specific locations characterized by a suitable topographical landscape which are not necessarily in the vicinity of power lines and therefore may not be beneficial to the utility company.

Another known fluid based energy storage and recovery system is a compressed-air energy storage system whereby ambient air is compressed and stored under pressure in an underground cavern. When electricity is required, the pressurized air is heated and expanded in an expansion turbine to drive a generator for power production.

U.S. Pat. No. 7,281,371 discloses a compressed air pumped hydro energy storage and distribution system that includes a first reservoir of water and a second reservoir of air and water. An air pressure source, connected to the second reservoir, develops a pressure head in the second reservoir. A pump/turbine-motor/generator connected to the first reservoir is also connected to a regional energy grid. During peak demand periods, the pressure head forces water through the pump/turbine-motor/generator to generate power, delivered to the grid. During low demand periods, the pump/turbine-motor/generator pumps water back to the second reservoir, regenerating the pressure head. The reservoirs can be tunnels or abandoned mines.

This prior art system is energy intensive as water has to be pumped back from the first reservoir to the second reservoir in order to regenerate the pressure head thereat without generating power during the flow between the first and second reservoirs. Another disadvantage of this prior art system is the need to deploy and maintain underground reservoirs at different elevations.

It is an object of the present invention to provide a hydraulic-pneumatic energy storage and recovery system that is economically viable and that can generate more power than prior art systems.

It is an additional object of the present invention to provide a hydraulic-pneumatic energy storage and recovery system that is independent of specific geological or underground features.

Other objects and advantages of the invention will become apparent as the description proceeds.

SUMMARY OF THE INVENTION

The present invention provides a hydraulic-pneumatic energy storage and recovery system, comprising first and second sealed containers within each of which a volume of liquid is introducible and from which said introduced liquid is pneumatically propellable; a turbine interposed between said first and second containers and coupled with a generator, to produce power when caused to be rotated by said pneumatically propelled liquid; and collection-delivery apparatus located externally to said first and second containers, for collecting energy-depleted liquid gravitating from said turbine and for delivering said collected liquid to one of said first and second containers, to be used in subsequent energy recovery cycles.

As referred to herein, "collection-delivery apparatus" may be function simultaneously as both collection apparatus for collecting energy-depleted liquid gravitating from said turbine and delivery apparatus for delivering said collected liquid to one of said first and second containers, or, alternatively, the delivery apparatus may be separate from the collection apparatus and operate after the liquid is collected.

The introduced liquid is pneumatically propellable by means of a volume of stored compressed air that is generatable with respect to each of the first and second containers.

In one aspect, the system further comprises an angled conduit introduced into each of the first and second containers, such that a first portion thereof extends downwardly into an interior of a corresponding container and a second portion thereof extends laterally from said first portion and above said corresponding container and terminates with a nozzle adapted to discharge high-pressure liquid; and means such as a control valve for releasing said stored compressed air, to cause at least a portion of the liquid volume introduced into the first container to be pneumatically propelled via said angled conduit and said nozzle until impinging upon blades of the turbine to produce power, wherein the turbine is located in a flow path of the high-pressure liquid discharged from said nozzle.

In one aspect, the system further comprises means for storing a volume of compressed air with respect to each of the first and second containers. The means for storing a volume of compressed air with respect to each of the first and second containers may comprise a compressor; an air tank in fluid communication with said compressor, within which said compressed air at a desired pressure is storable; and an air conduit in controllable fluid communication with an interior of a corresponding one of each of the first and second containers and of said air tank, so that the introduced liquid is pneumatically propellable to the nozzle upon setting said air conduit in fluid communication with the interior of the corresponding container.

In one aspect, the volume of stored compressed air is generatable upon influx of the liquid into the interior of the corresponding container. A sufficiently high pressure of compressed air is generatable when the collection apparatus is a receptacle for receiving the collected energy-depleted liquid discharged from the turbine and the delivery apparatus is a pump for delivering pressurized liquid from said receptacle into the interior of the corresponding container.

The first and second containers are also thermally insulated for retaining heat that is generated during air compression.

In one aspect, the collection-delivery apparatus is a horizontal and stationary surface located directly below, and is interposed between, two closable openings formed in the first and second containers, respectively, the collected liquid rising above said surface and being introduced into one of said openings that has been kept open.

In one aspect, the collection-delivery apparatus is a pivotal surface driven by a motor and interposed between two closable openings formed in the first and second containers, respectively, the collected liquid flowing downwardly along said pivotal surface and being introduced into one of said openings that has been kept open.

The present invention is also directed to a hydraulic-pneumatic energy storage and recovery method, comprising;
a) providing first and second sealed containers;
b) introducing liquid into said first container;
c) storing a first volume of fluid energy with respect to said first container;
d) releasing said first-volume energy, to cause at least a portion of the liquid introduced into said first container to be pneumatically propelled;
e) directing said propelled liquid from said first container to a turbine to produce power;
f) collecting, externally to said first and second containers, energy-depleted liquid gravitating from said turbine;
g) delivering said collected liquid to said second container;
h) storing a second volume of fluid energy with respect to said second container;
i) releasing said second-volume energy, to cause at least a portion of the liquid introduced into said second container to be pneumatically propelled; and
j) directing said propelled liquid from said second container to said turbine to produce power.

DETAILED DESCRIPTION OF PREFERRED EMBODIMENTS

The present invention is a stored energy system that exploits the force applied by compressed air to force displacement of a volume of water or any other suitable liquid onto an electric power generating element. The system is also able to generate power when the circulating water is being recycled. Although the following description describes the use of water as the medium which is propelled by the pneumatic source of energy, it will be appreciated that, the invention is also applicable to the use of other types of liquids as well.

Figure 1:
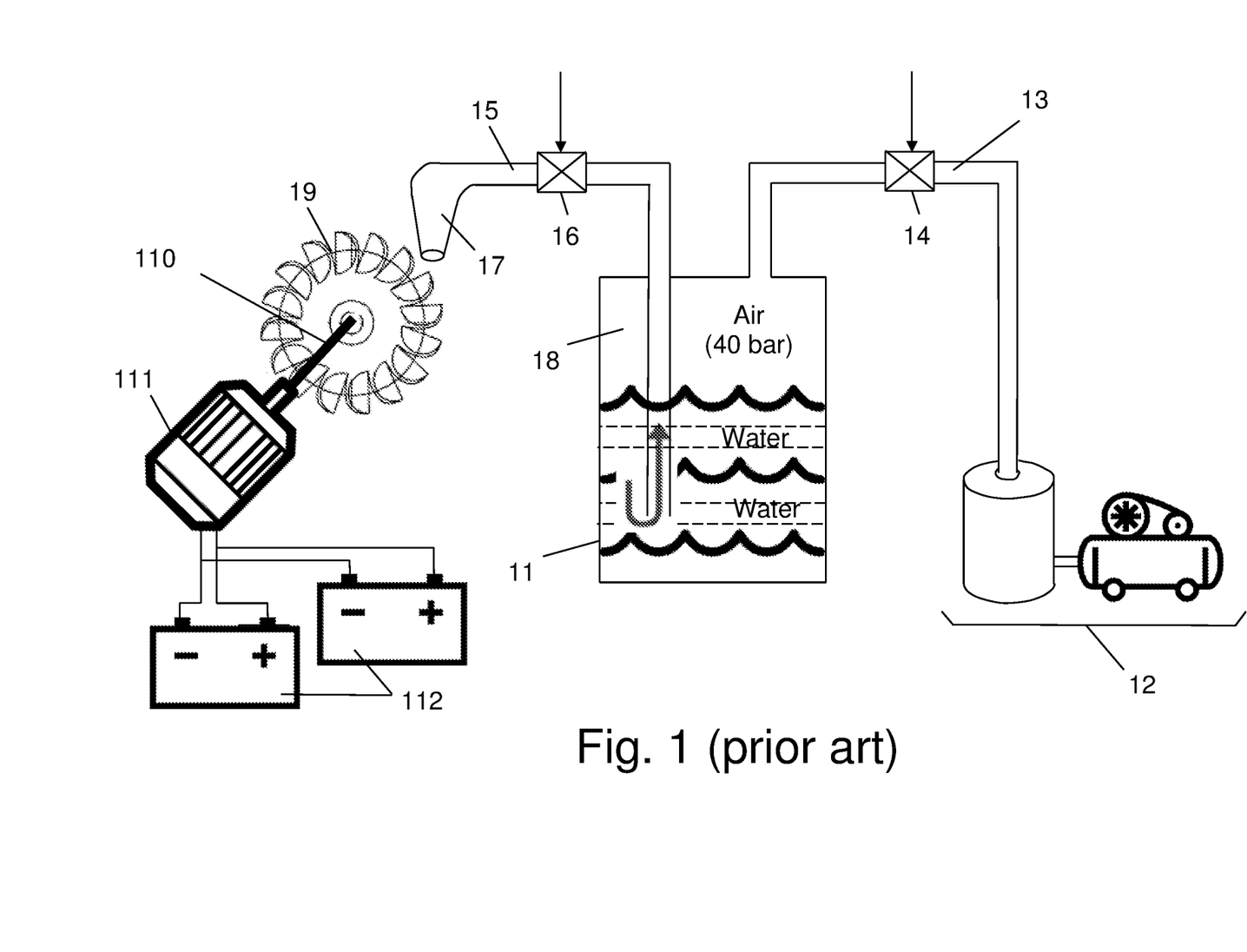
FIG. 1 is a schematic illustration of a prior art hydraulic-pneumatic energy storage and recovery system by which a liquid is pneumatically propelled to generate electric power.

FIG. 1 illustrates a prior art compressed-air stored energy system that forces displacement of water by compressed air, to generate electric power. The system 10 comprises a sealed container 11, which is partially filled with water (e.g., about 70%). The container 11 is in fluid communication with a compressor 12 via an air conduit 13 to which a control valve 14 is operatively connected. A water conduit 15 to which a control valve 16 is operatively connected is introduced into container 11, such that a first end thereof extends nearly to its bottom, while its second end terminates with a nozzle 17, which is adapted to discharge a jet of high-pressure water. Impulse turbine 19, e.g. a Pelton wheel, for producing torque from the impulse caused by a change in direction of the water jet impinging upon its contoured blades is located in the flow path of nozzle 17 and is rigidly connected to a shaft 110, which is mechanically coupled to a generator 111. Generator 111 is connected to a set of batteries 112, for storing electrical energy. The system operates in two cycles: a charge cycle and a discharge cycle, as will be explained below.

Charge Cycle:

The charge cycle is performed during low-cost off-peak hours, such as during the night. In the first step, valve 16 is kept closed and valve 14 is kept open. Then compressor 12 is activated to compress air within the interior 18 of container 11, until a desired pressure (e.g., about 40 bars) is reached. Then compressor 12 is deactivated and valve 14 is closed, while the compressed air remains stored within interior 18, until discharge begins.

Discharge Cycle:

The discharge cycle is performed during high-cost peak hours, such as during the daytime, when the cost of electric power is expensive. In the first step, valve 14 is kept closed and valve 16 is opened. As a result, the pressure of the compressed air within 18 forces displacement of water outwardly from container 11 through conduit 15. Upon reaching nozzle 17, the pressurized water is discharged and causes rotation of turbine 19 and shaft 110. This rotation is converted by generator 111 into electrical energy that can be delivered directly to a load, sold to the electric grid, or stored by the set of batteries 112.

However, the prior art system of FIG. 1 is not sufficiently efficient, since the discharged water that caused rotation of turbine 19 should preferably be recycled and delivered back into container 11, in order to be reused during successive charge/discharge cycles. Water recycling is energy intensive, and reduces net energy output, if not used for subsequent cycles.

Figure 2:
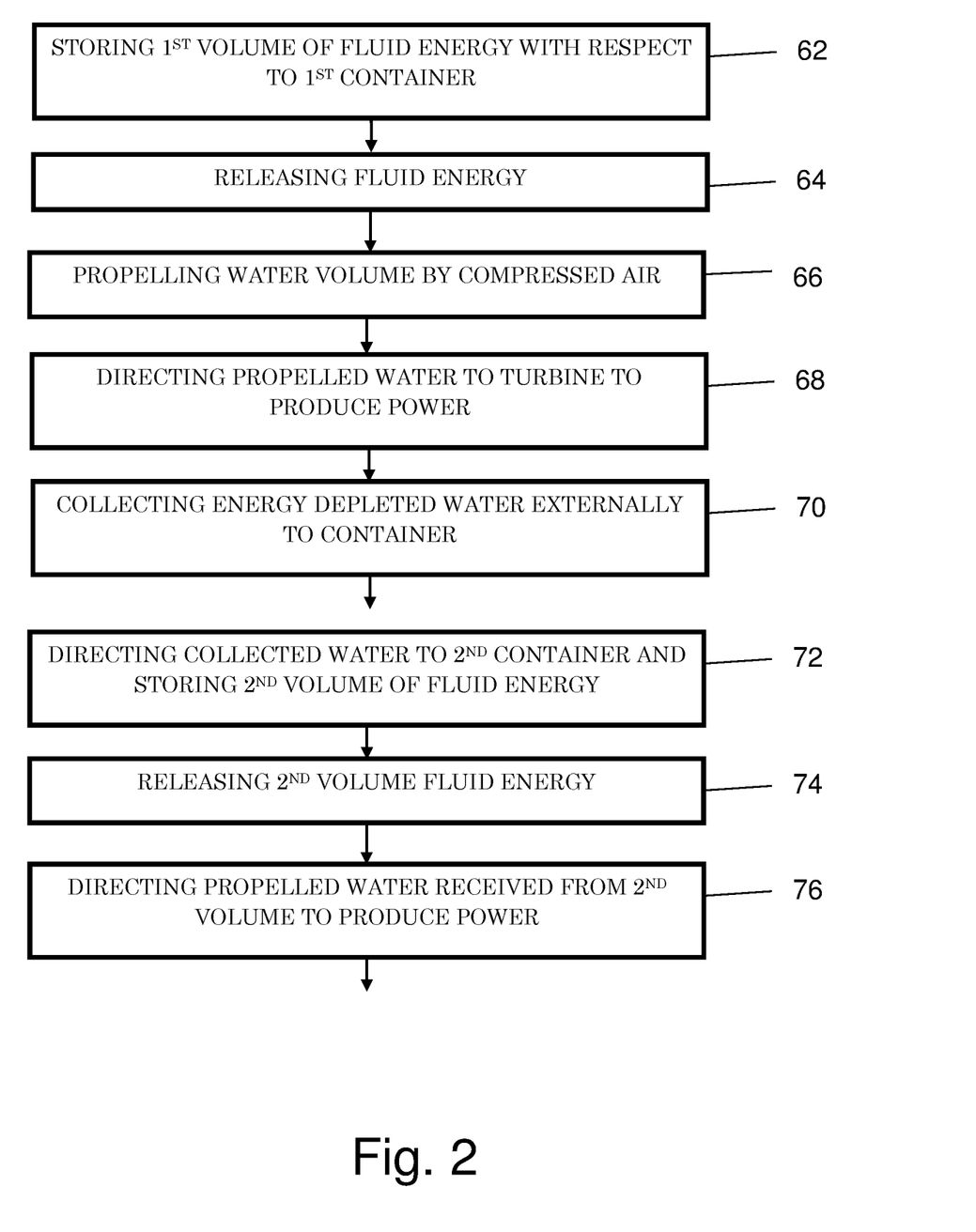
FIG. 2 is a flow chart of a hydraulic-pneumatic energy storage and recovery method, according to an embodiment of the invention.

Broadly speaking, FIG. 2 illustrates a hydraulic-pneumatic energy storage and recovery method, according to an embodiment of the invention. A first volume of fluid energy is stored with respect to a first container in step 62. When the first-volume fluid energy is released in step 64, a volume of water is propelled from the first container by a volume of compressed air in step 66, and is directed to a turbine in step 68, which is caused to rotate in response to the ejected water flow and to thereby produce power. In step 72, the energy-depleted propelled water is collected externally to the first container in step 70 and is directed to a second container at the same elevation as the first container, whether aboveground or underground, and also externally to the collection apparatus, for reuse in conjunction with a second volume of stored fluid energy identical or common to the first volume.

The second-volume fluid energy is released in step 74, to propel the volume of water from the second container onto the same turbine in step 76 and to produce power. Thus power is advantageously able to be produced in any number of subsequent recycling cycles.

Figure 3A:
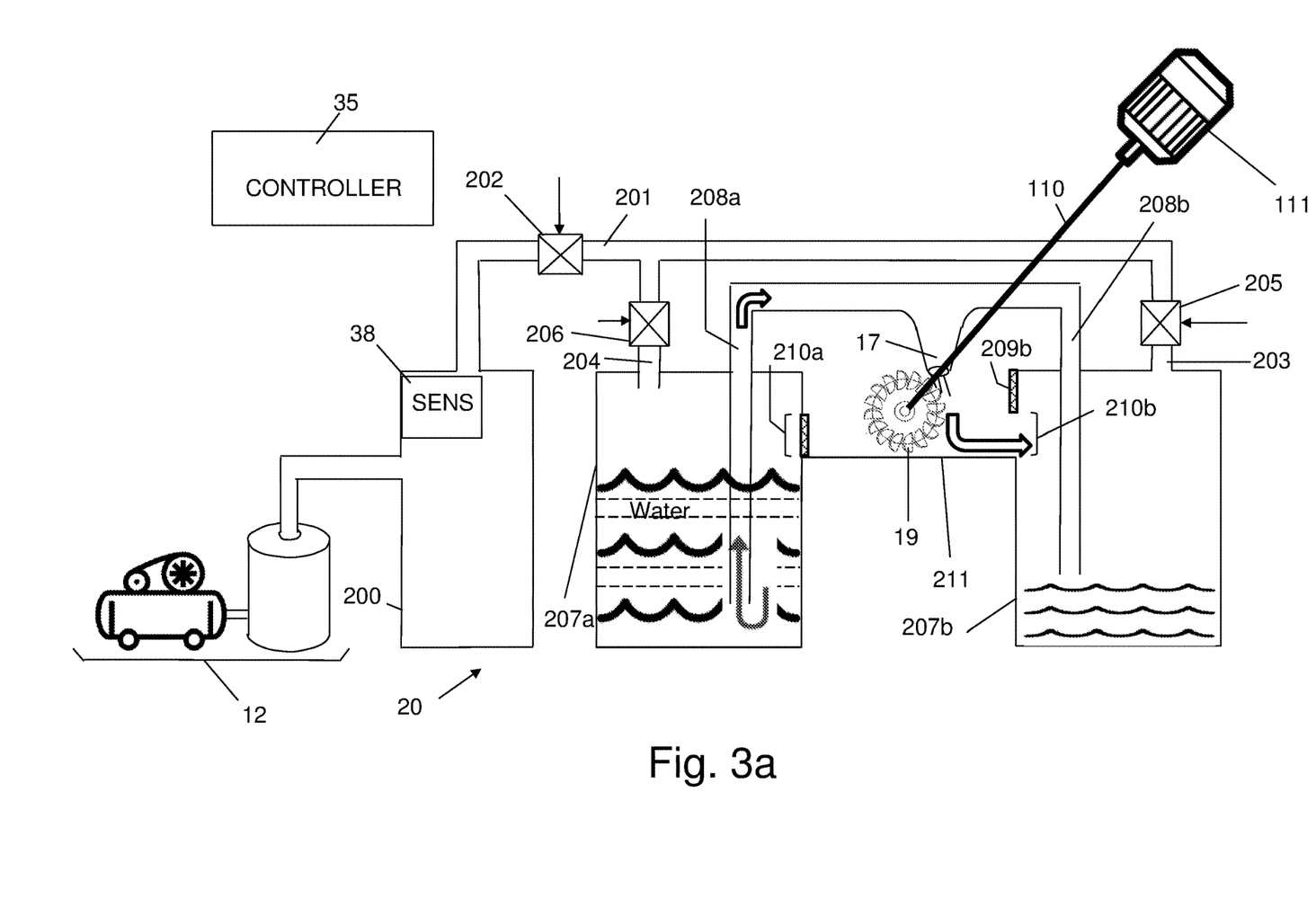
FIGS. 3a and 3b are a schematic illustration of two stages, respectively, of a hydraulic-pneumatic energy storage and recovery system, according to an embodiment of the invention.
Figure 3B:
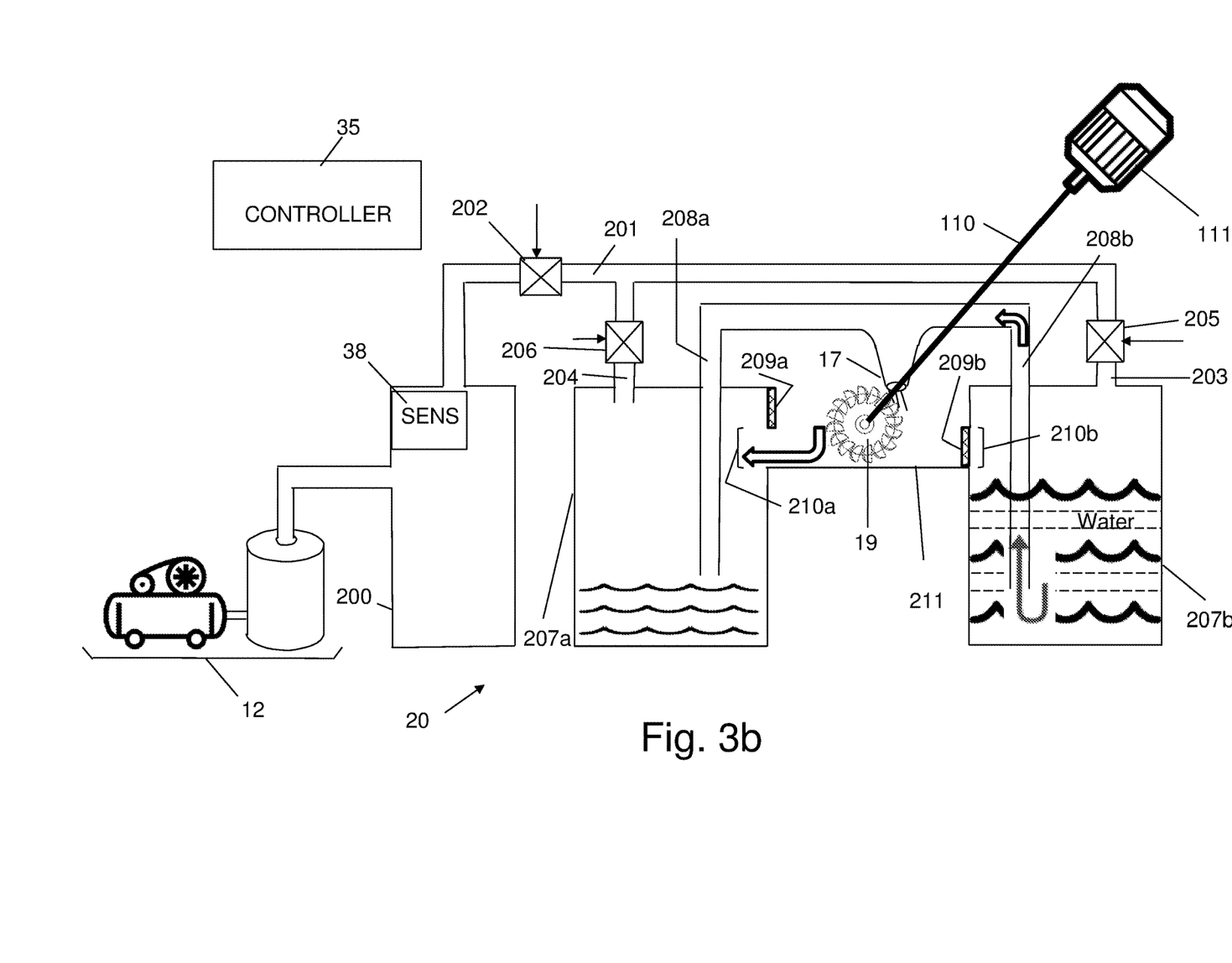

FIGS. 3a and 3b illustrate a hydraulic-pneumatic energy storage and recovery system 20 by which compressed air forces displacement of water to generate electric power, according to an embodiment of the invention, while the displaced water is recycled for use in additional cycles. In this embodiment, the volume of fluid energy is a charge of compressed air that is stored in an air tank which is capable of being set in fluid communication with the container containing the volume of propellable water.

The system 20 comprises an air tank 200 in fluid communication with a compressor 12, within which pressurized air at a desired air pressure (e.g., 40 bar or more) is accumulated. An air conduit 201 with which control valve 202 is operatively connected extends from the top of air tank 200 and branches into two air conduits 203 and 204, with which control valves 205 and 206, respectively, are operatively connected. Conduit 204 extends to a first sealed container 207a, which is partially filled with water (e.g., about 70%). The first sealed container 207a has a controlled openable and closable shutter 209a, or any other suitable movable partition, such that when being closed, seals container 207a by covering an opening 210a formed in the first sealed container 207a and when being opened, allows water to flow into first sealed container 207a via opening 210a. A water conduit 208a is introduced into container 207a, such that a first end thereof extends nearly to its bottom, while its second end terminates with nozzle 17 having two inputs, which is adapted to discharge a jet of high-pressure water.

Conduit 203 extends to a second sealed container 207b, which may be initially empty. The second sealed container 207b has a controlled openable and closable shutter 209b, or any other suitable movable partition, such that when being closed, seals container 207b by covering an opening 210b formed in the second sealed container 207b and when being open, allows water to flow into second sealed container 207b via opening 210b. Water conduit 208b is introduced into second container 207b, such that a first end thereof extends nearly to the bottom of second container 207b, while its second end terminates at the second input to nozzle 17. Impulse turbine 19, or any other type of turbine, is located in the flow path of the water jet discharged from nozzle 17, in order to be caused to be rotated by the water jet, and is rigidly connected to shaft 110, which is mechanically coupled to generator 111. Generator 111 may be connected to a set of batteries 112, for storing the generated electrical energy.

Air tank 200 and containers 207a and 207b are all preferably of the same volume and located at the same elevation.

A substantially horizontal and stationary surface 211 is located directly below, and is interposed between, openings 210a and 210b, and is adapted to collect all the water gravitating from turbine 19. As the water level above surface 211 rises, the collected water is introduced into one of the containers 207a or 208a, depending on which opening 210a or 210b has been kept open.

The system 20 may also comprise a controller 35 in data communication with compressor 12, in order to control the target air pressure within the interior of air tank 200, in accordance with a predetermined time of operation or in accordance with sensed pressure conditions detected by sensor 38 mounted within the interior of air tank 200.

Controller 35 may also be in data communication with control valves 202, 205, 206, and with shutters 209a and 209b, in order to ensure reliable operation of the charge and discharge cycles.

The system 20 operates in periods of four cycles each: two charge cycles and two discharge cycles, as will be explained below.

FIG. 3a illustrates first charge/discharge cycles performable in conjunction with system 20.

First Charge Cycle:

The first charge cycle is performed during low-cost off-peak hours, such as during the night. In the first step, valve 202 is kept closed and compressor 12 is activated to compress air contained within air tank 200, until a desired pressure (e.g., about 40 bars or more) is reached. Then compressor 12 is deactivated and valve 202 is closed and the compressed air remains stored within air tank 200, until the first discharge cycle begins.

First Discharge Cycle:

The first discharge cycle may be performed during high-cost peak hours, such as during the daytime. In the first step, shutter 209a is set to its lower position, such that opening 210a is sealed. Simultaneously, shutter 209b is set to its upper position, such that opening 210b is open. In the next step, valve 205 is kept closed and valves 202 and 206 are opened. As a result, the compressed air within air tank 200 flows to the lower-pressure interior of container 207a via conduit 204, and forces displacement of water outwardly from container 207a via conduit 208a. The pressure of the compressed air is sufficiently high to cause all, or a large percentage, e.g. greater than 70%, such as greater than 80% or 90%, of the volume of water originally received within container 207a to be discharged therefrom. Upon reaching nozzle 17, the pressurized water is discharged onto the turbine blades and causes rotation of turbine 19 and shaft 110. This rotation is converted by generator 111 into a relatively large level of electrical energy that can be delivered directly to a load, sold to the electric grid, or stored by a set of batteries, in response to the relatively large percentage of water that has been pneumatically propelled to turbine 19.

During this first discharge cycle, all energy-depleted water gravitating from turbine 19 is collected by horizontal surface 211, and is subsequently introduced into container 207b via opening 210b after the water level rises. At the end of the first discharge cycle, the water that was displaced outwardly from container 207a, which may be the entire of volume of water that was contained within container 207a, or only a percentage thereof, depending on the pressure of the compressed air, is introduced into container 207b.

FIG. 3b illustrates second charge/discharge cycles performable in conjunction with system 20.

Second Charge Cycle:

The second charge cycle is also performed during low-cost off-peak hours. In the first step, valve 202 is kept closed and compressor 12 is activated to compress the air within air tank 200, until a desired pressure (e.g., about 40 bars or more) is reached. Then compressor 12 is deactivated while the compressed air remains stored within air tank 200, until the second discharge cycle begins.

Second Discharge Cycle:

The second discharge cycle may be performed during high-cost peak hours, when greater revenue may be realized by selling generated electric power to the electric grid, for example after the generated electric power has been stored by the batteries. In the first step, shutter 209b is kept in its lower position, such that opening 210b is sealed. Simultaneously, shutter 209a is kept in its upper position, such that opening 210a is open. In the next step, valve 206 is kept closed and valves 202 and 205 are opened. As a result, the compressed air within air tank 200 forces displacement of water outwardly from container 207b via conduit 208b and reach nozzle 17. Upon reaching nozzle 17, the pressurized water is discharged and causes rotation of turbine 19 and shaft 110. This rotation is converted by generator 111 into electrical energy that can be delivered directly to a load, sold to the electric grid, or stored by a set of batteries. During this second discharge cycle, all the discharged water is collected by horizontal surface 211, and is subsequently introduced into container 207a via opening 210a after the water level rises.

During this second discharge cycle, the discharged water collected by substantially horizontal surface 211 which may be the entire of volume of water that was contained within container 207b, or only a percentage thereof, depending on the pressure of the compressed air, is introduced back into container 207a via opening 210a.

It will be appreciated that a large number of discharge cycles may be performed during off-peak hours, to benefit from the low cost of electricity to generate the compressed air and from the relatively high power output during each discharge cycle.

Figure 4A:
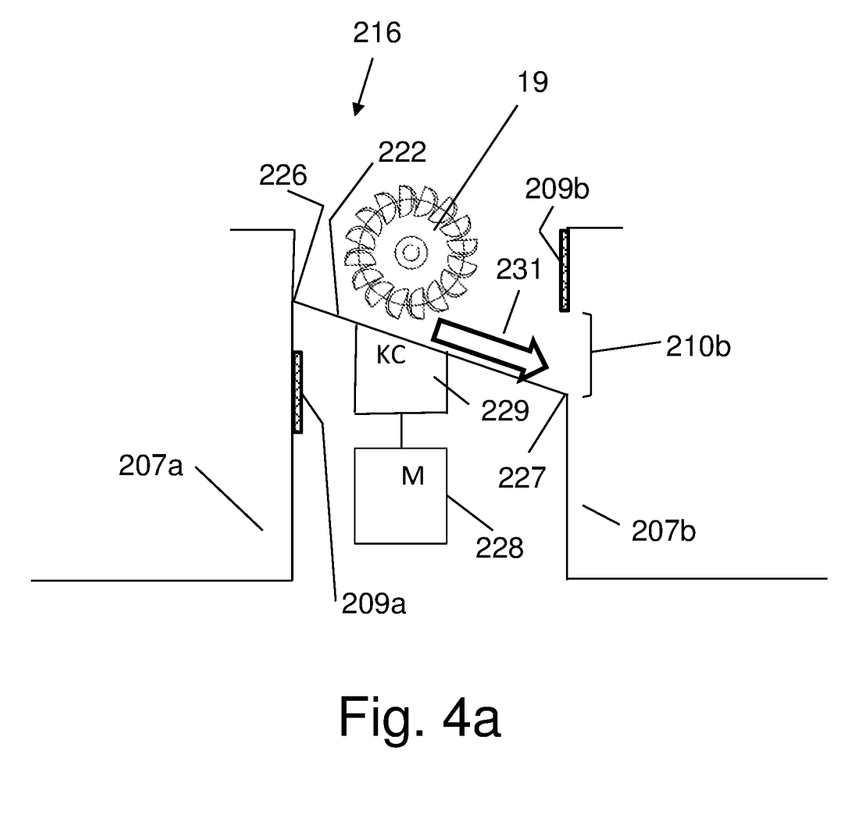
FIGS. 4a and 4b are a schematic illustration of two positions, respectively, of collection apparatus, according to an embodiment of the invention.
Figure 4B:
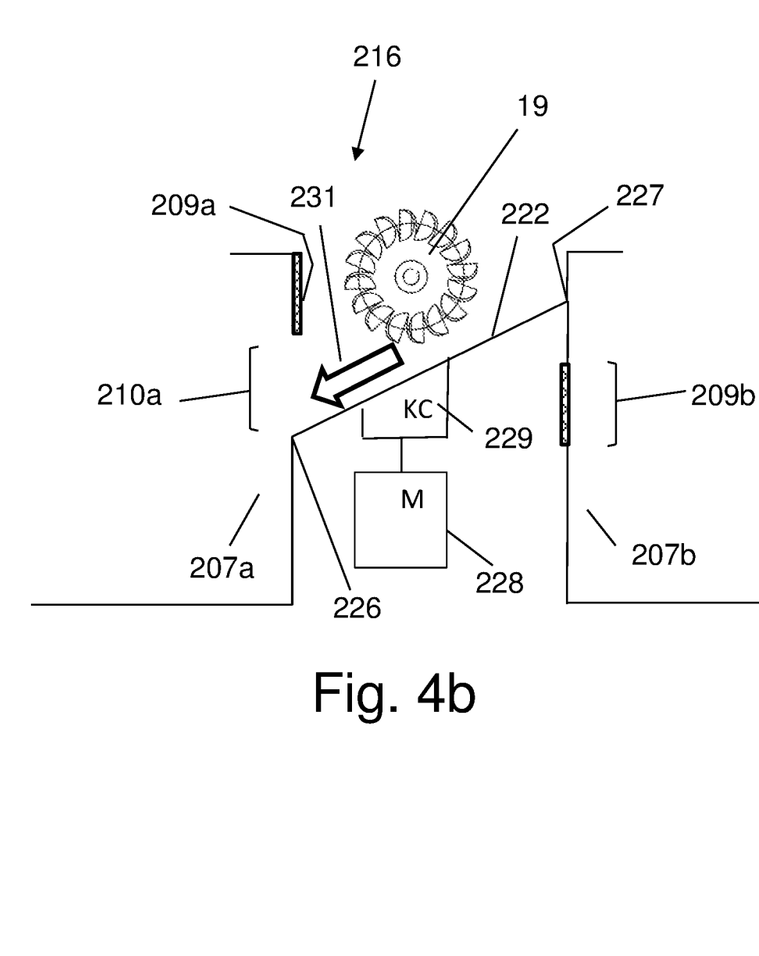

FIGS. 4a and 4b schematically illustrates another embodiment of collection apparatus 216 adapted to collect and direct energy-depleted water that is discharged from turbine 19. In this embodiment, collection apparatus 216 comprises a pivotal surface 222, which is driven by motor 228 in data communication with controller 35 (FIG. 3a) and by means for example of a toothed segment or any other suitable kinematical connection (KC) 229 that imparts rotary motion.

When shutter 209a of container 207a is set to its lower position to prevent ingress and egress of water with respect to the interior of container 207a, and shutter 209b of container 207b is set to its upper position such that opening 210b is unobstructed, pivotal surface 222 is driven such that a first end 226 thereof is higher than a second end 227 thereof, as illustrated in FIG. 4a, to ensure that the energy-depleted turbine discharge 231 will be gravitationally delivered towards opening 210b and container 2071. Conversely, when shutter 209a of container 207a is set to its upper position such that opening 210a is unobstructed, and shutter 209b of container 207b is set to its lower position, pivotal surface 222 is driven such that first end 226 thereof is lower than second end 227 thereof, as illustrated in FIG. 4b, to ensure that the energy-depleted turbine discharge 231 will be gravitationally delivered towards opening 210a and container 207a. Ends 226 and 227 contacting a corresponding container wall may be sealed to prevent passage of discharge 231 below pivotal surface 222.

Other configurations of a collection apparatus are also in the scope of the invention, for example a structure that encloses the turbine and directs the turbine discharge through a conduit that extends to a control unidirectional valve, e.g. a check valve, which is operatively connected to a wall of a corresponding container, so that when actuated by a signal from the controller, will allow the turbine discharge to be introduced into the corresponding container.

FIGS. 5a-d schematically illustrate another embodiment of a hydraulic-pneumatic energy storage and recovery system 320. In this embodiment, the volume of fluid energy is a volume of air which is compressed without use of a compressor, and the compressed air is located in the same container as a volume of water during a charge cycle. The volume of water is slightly less than the volume of the container, e.g. ranging from 80-90% of the container volume, and causes the volume of air to become compressed. Also, the collection apparatus is non-planar, and the collected water is recycled by means of an active delivery unit which delivers the collected water to a container having a reduced water level.

Figure 5A:
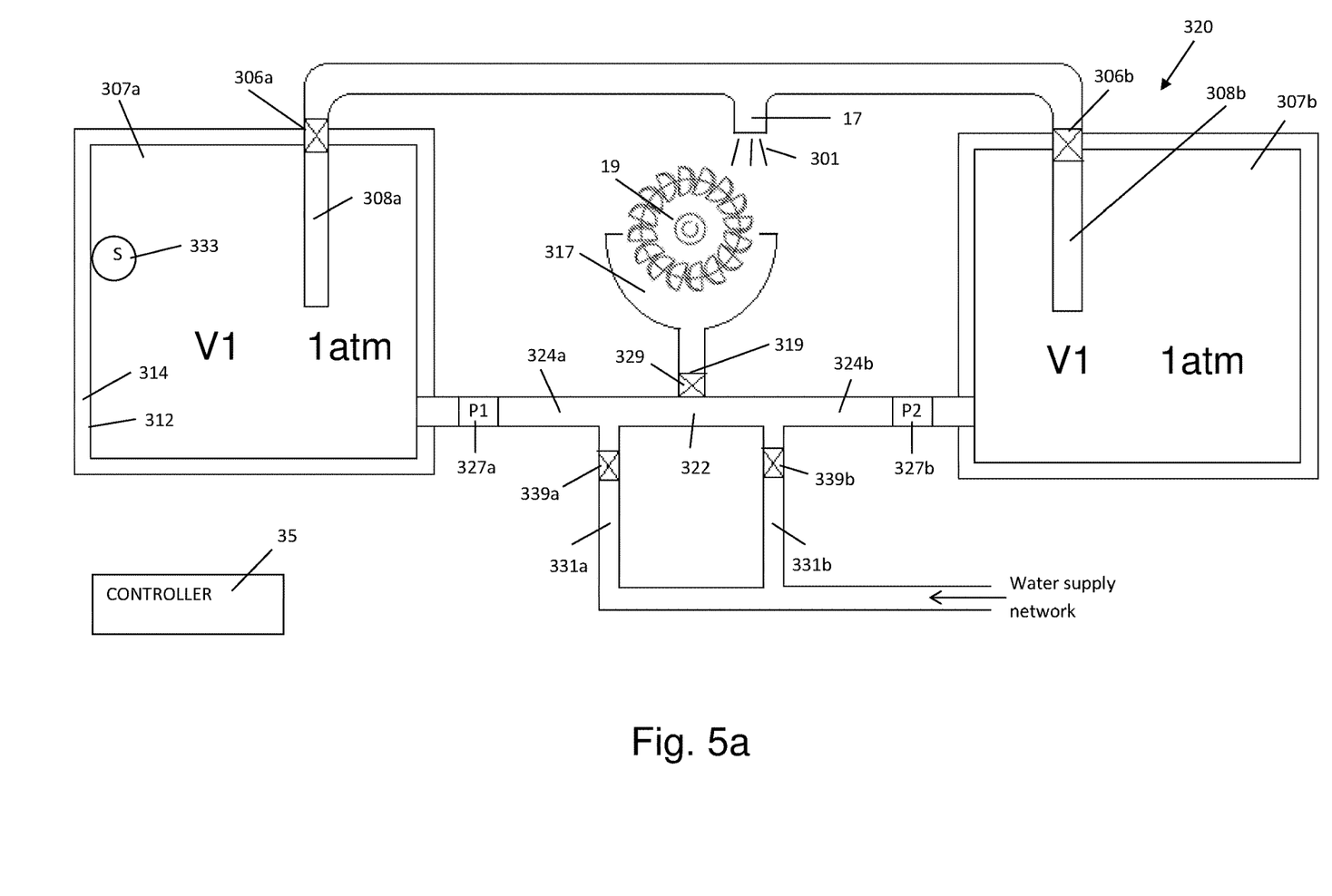
FIGS. 5a-5d are a schematic illustrations of four stages, respectively, of a hydraulic-pneumatic energy storage and recovery system, according to another embodiment of the invention.

System 320 comprises two sealed and thermally insulated containers 307a and 307b, which are preferably of the same volume and located at the same elevation, and a peripheral sealing element 312 of each container 307a-b may be located inwardly with respect to a corresponding peripheral thermal insulation element 314. Containers 307a and 307b, similar to containers 207a and 207b of FIG. 3a, are pressure vessels that are sufficiently sturdy to withstand relatively high fluid pressures of at least 40 bar.

Angled water conduits 308a and 308b are introduced into, and secured such as ley welding to, containers 307a and 307b, respectively such that a first end of the downwardly extending portion of the conduit extends nearly to the bottom of the corresponding container, while a second end of the horizontally extending portion of the conduit terminates with nozzle 17 having two inputs accommodating the discharge from either of the conduits 308a and 308b. Angled water conduits 308a and 308b, similar to conduits 208a and 208b of FIG. 3a, are sufficiently sturdy to withstand relatively high fluid pressures of at least 40 bar. Nozzle 17 is adapted to discharge a jet 301 of high-pressure water onto turbine 19. Control valves 306a and 306b in data communication with controller 35 are operatively connected to conduits 308a and 308b, respectively, and serve to maintain the pressure and temperature within the corresponding container when closed and allow the flow of propelled water when opened.

The collection apparatus may be a funnel 317 or any other drainable receptacle, which receives the energy-depleted water discharged from turbine 19. The bottom outlet 319 of funnel 317 guides the received water to, and is connected with, a T-shaped fitting 322 having two opposed, open and substantially horizontal conduit portions 324a and 324b in fluid communication with containers 307a and 307b, respectively. An isolation valve 329, e.g. a control valve in data communication with controller 35, may be installed in fitting 322 below outlet 319. Independently operable pumps 327a and 327b in data communication with controller 35 are operatively connected to conduit portions 324a and 324b, respectively. Makeup water lines 331a and 331b, for example connected to a water supply network, are connected to conduit portions 324a and 324b, respectively, and may be individually isolated by control valves 339a and 339b, respectively, in data communication with controller 35.

During starting conditions, as shown iii FIG. 5a, containers 307a and 307b are empty, and are provided with a volume V1 of atmospheric air.

In use, water is first admitted to receptacle 317 by opening one of the makeup valves, e.g. 339a, and isolation valve 329 for a sufficient period of time until receptacle 317 is at least partially filled. After makeup valve 339a is closed, pump 327a is activated to deliver a desired amount of water from receptacle 317 to container 307a. The volume of water that is delivered from receptacle 317 to container 307a may be controlled in response to the monitored activation time of pump 327a, which corresponds to a total volume of water that is delivered when knowing the pump capacity. Alternatively, the volume of water that, is delivered to container 307a may be controlled by means of one or more sensors 333, e.g. level sensors, which transmit a signal controller 35 to deactivate pump 327a when the water level within container 307a reached a predetermined height. Isolation valve 329 is then closed.

Figure 5B:
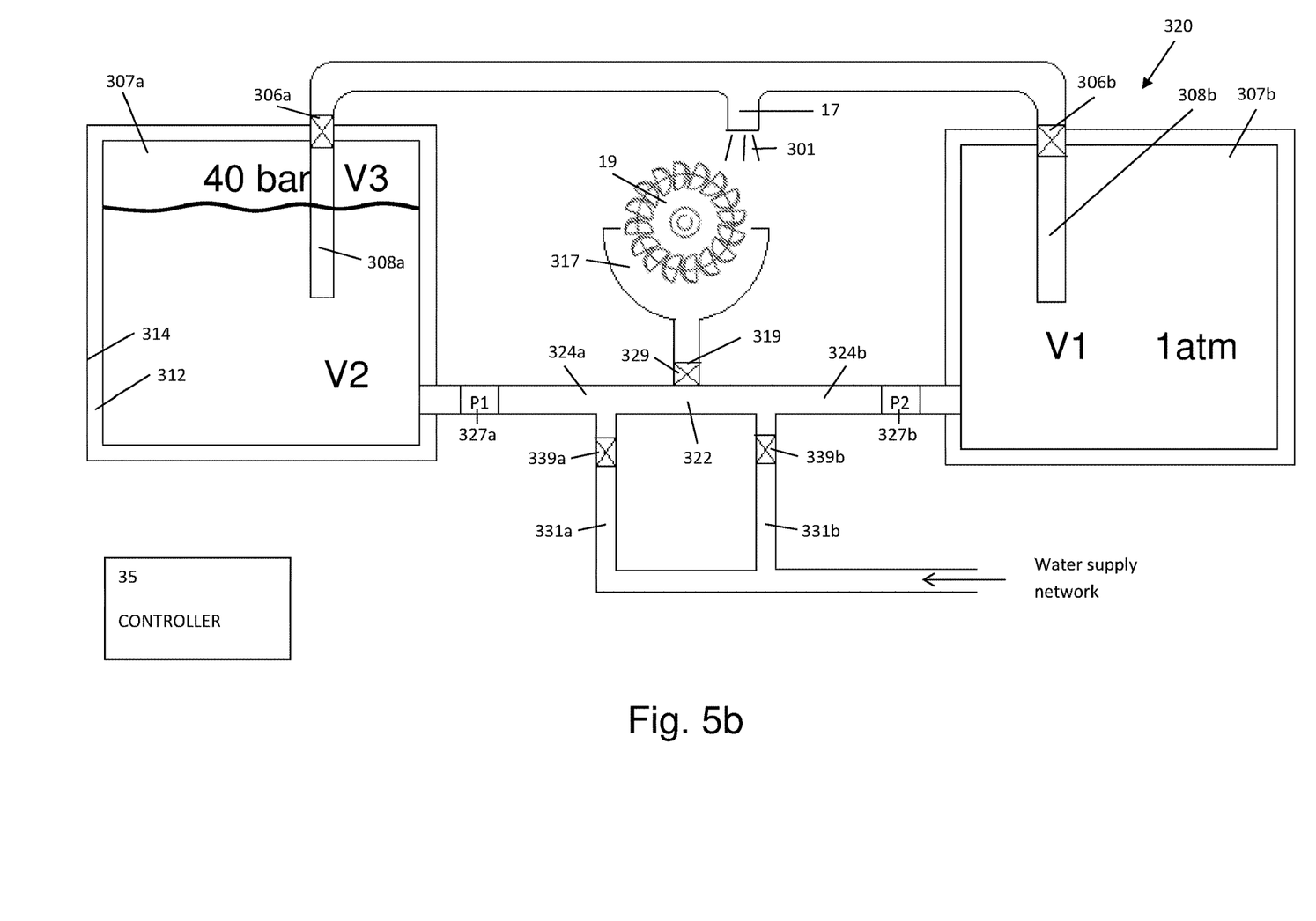

Following delivery of volume V2 of water to sealed container 307a, as shown in FIG. 5b, the air trapped within container 307a becomes compressed to volume V3 by the influx of volume V2 of water, e.g. having a pressure of 40 bar, whereby upper water surface 334 prevents air expansion. The air molecules become loaded with a significant amount of potential energy by the force applied by the introduced water. At the same time, the temperature of the air rises during the compression stage due to the increase in kinetic energy of the air molecules and the corresponding increase in molecular collisions. Thus the heat of the increased-temperature air is transferred to the water, and the heated water is retained for a period of time by the thermally insulated container 307a.

Figure 5C:
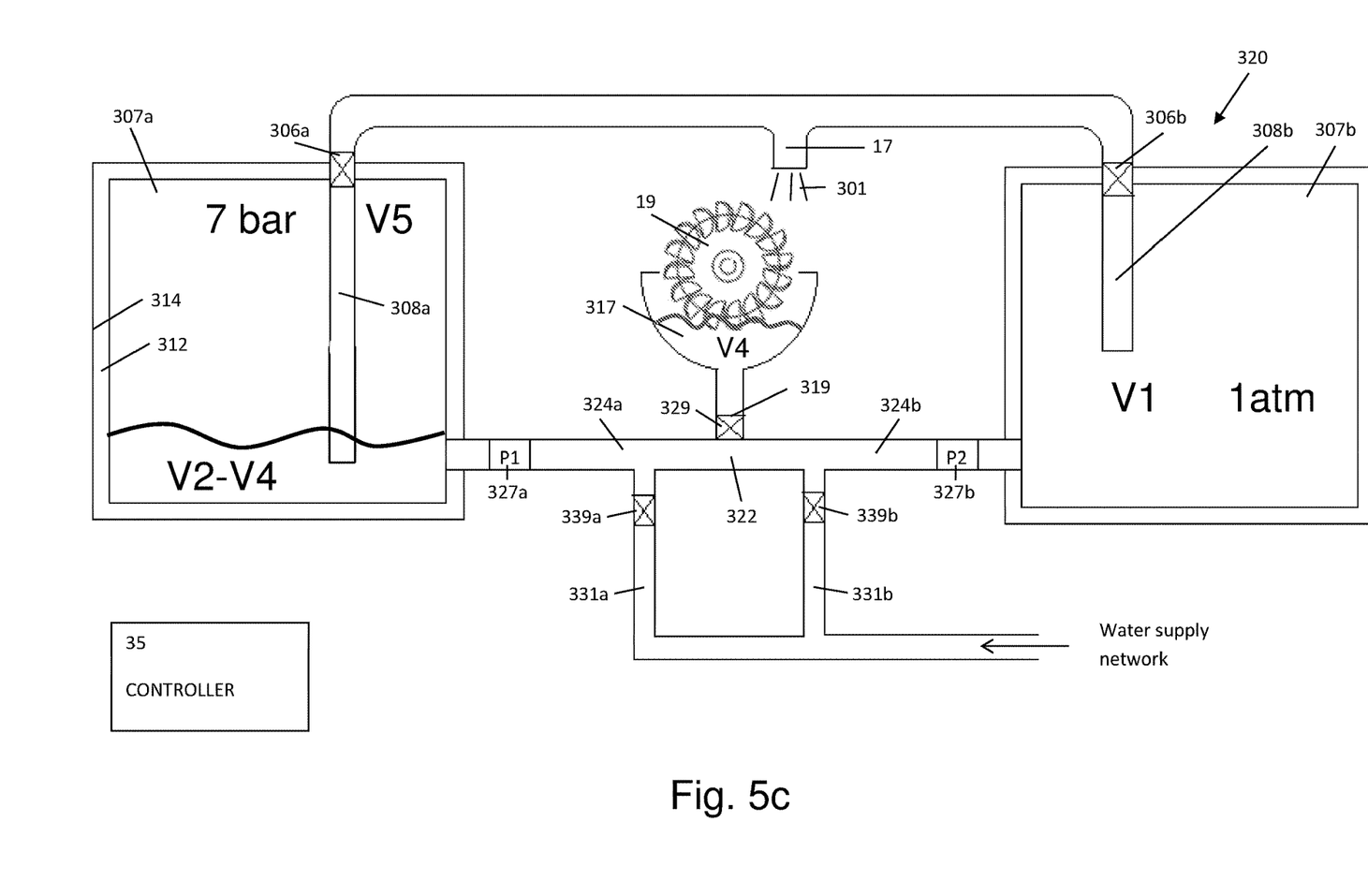

Referring next to FIG. 5c, the potential energy of the compressed air is released by opening control valve 306a, so that the compressed air drives the water retained in container 307a in piston-like fashion through lower opening 337 of conduit 308a to nozzle 17, due to the pressure differential of air between volume V3 and at the exit of nozzle 17. At first, water flows through conduit 308a at a significantly high flow rate and impinges the blades of turbine 19 to produce a correspondingly high level of power, and eventually, after the air pressure differential is reduced, the water flow rate and produced power level are also reduced. At the end of the discharge cycle when the air pressure within container 307a reaches an equilibrium volume of V5 and an equilibrium pressure of e.g. 7 bar, the total volume of energy-depleted and heated water that is received in receptacle 317 is V4 and the volume of water remaining in container 307a is V2-V4. Control valve 306a is then closed.

Figure 5D:
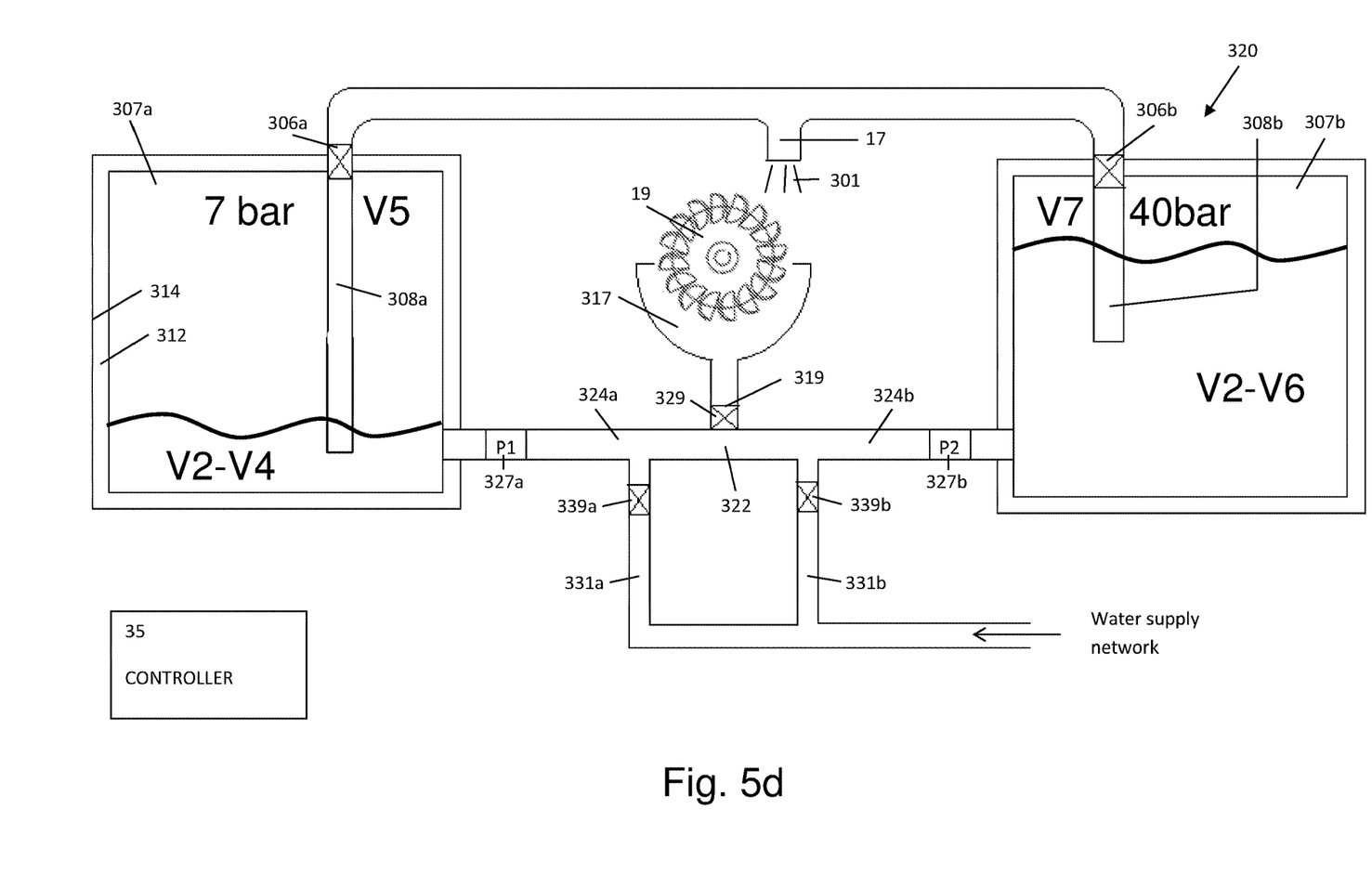

In the subsequent charge cycle shown in FIG. 5d, isolation valve 329 is opened and pump 327 is activated to cause flow of heated water volume V4 to container 307b. As the influx of water volume V4 to container 307b is insufficient to satisfactorily compress the trapped air, makeup valve 339b is opened to supplement the volume of water that is introduced to container 307b, and is then closed after a desired volume of makeup is introduced into container 307b. The total volume of water that is needed to sufficiently compress the air trapped within container 307b to e.g., 40 bar is V2-V6, less than the volume V2 needed to compress the air trapped within container 307a to the same pressure. V6 is a small volume of approximately 2 L. Since the volume of water V4 propelled from container 307a to receptacle 317, and delivered from receptacle 317 to container 307b, is heated, the heat content of the heated water is transferred to the volume of compressed air V7. The pressure of the compressed air is additionally increased as a result of the increased air temperature, thus reducing by V2 the volume of makeup water that is needed. Alternatively, the additional volume V2 of makeup water is also introduced to container 307b, causing the pressure of compressed air to rise above the pressure of air volume V1 in container 307a and thereby producing more power.

The next discharge cycle is performed by opening control valve 306b, to cause water volume V2-V6 to be pneumatically propelled to nozzle 17 and to thereby produce power by means of turbine 19. The water received in receptacle 317 is then delivered to container 307a by pump 327a.

These charge and discharge cycles may be repeatedly performed by system 320 during off-peak hours, or even during peak hours as the only electric energy consumption is by pumps 327a and 327b. The electrical power that is produced may be stored in a bank of batteries and be later sold to the electrical grid during peak hours. Although the amount of power produced during each discharge cycle is generally less than produced by system 20 of FIGS. 3a-b since only a fraction of the water volume V2 received by container 307a is pneumatically propelled to turbine 19, the net energy output of system 320 may be greater than that of system 20 since system 320 saves the energy consumption of an energy intensive compressor. System 20 will be the preferred choice when a large amount of power is desired to be produced.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A hydraulic-pneumatic energy storage and recovery system, comprising:
    first and second containers within each of which a volume of liquid is introducible and from which said introduced liquid is pneumatically propellable by means of a volume of stored compressed air that is generatable with respect to each of the first and second containers;
    a turbine interposed between said first and second containers and coupled with a generator, to produce power when caused to be rotated by said pneumatically propelled liquid; and
    a collection-delivery apparatus located externally to said first and second containers, including a receptacle for collecting energy-depleted liquid gravitating from said turbine and a pump connected to said receptacle for delivering said collected liquid to one of said first and second containers, to be used in subsequent energy recovery cycles, and the volume of stored compressed air is generatable by said pump forcing influx of the liquid into an interior of a corresponding container of the first and second containers.

2. The system of claim 1, wherein the first and second containers are also thermally insulated for retaining heat that is generated during air compression.

3. The system of claim 1, wherein the collection-delivery apparatus is a horizontal and stationary surface located directly below, and is interposed between, two closable openings formed in the first and second containers, respectively, the collected liquid rising above said surface and being introduced into one of said openings that has been kept open.

4. The system of claim 1, further comprising:
    an angled conduit introduced into each of the first and second containers, such that a first portion thereof extends downwardly into an interior of a corresponding container and a second portion thereof extends laterally from said first portion and above said corresponding container and terminates with a nozzle adapted to discharge high-pressure liquid; and
    a means for releasing said stored compressed air, to cause at least a portion of the liquid volume introduced into the first container to be pneumatically propelled via said angled conduit and said nozzle until impinging upon blades of the turbine to produce power,
    wherein the turbine is located a flow path of the high-pressure liquid discharged from said nozzle.

5. The system of claim 4, further comprising means for storing a volume of compressed air with respect to each of the first and second containers.

6. The system of claim 5, wherein the means for storing a volume of compressed air with respect to each of the first and second containers comprises a compressor;
an air tank in fluid communication with said compressor, within which said compressed air at a desired pressure is storable; and
an air conduit in controllable fluid communication with an interior of a corresponding one of each of the first and second containers and of said air tank, so that the introduced liquid is pneumatically propellable to the nozzle upon setting said air conduit in fluid communication with the interior of the corresponding container.

7. A hydraulic-pneumatic energy storage and recovery system, comprising:
first and second sealed containers within each of which a volume of liquid is introducible and from which said introduced liquid is pneumatically propellable;
a turbine interposed between said first and second containers and coupled with a generator, to produce power when caused to be rotated by said pneumatically propelled liquid; and
a collection-delivery apparatus located externally to said first and second containers, for collecting energy-depleted liquid gravitating from said turbine and for delivering said collected liquid to one of said first and second containers, to be used in subsequent energy recovery cycles, said collection-delivery apparatus including a pivotal surface driven by a motor and interposed between two closable openings formed in the first and second containers, respectively, the collected liquid flowing downwardly along said pivotal surface and being introduced into one of said openings that has been kept open.

8. The system of claim 7, wherein the introduced liquid is pneumatically propellable by means of a volume of stored compressed air that is generatable with respect to each of the first and second containers.

9. The system of claim 8, further comprising:
an angled conduit introduced into each of the first and second containers, such that a first portion thereof extends downwardly into an interior of a corresponding container and a second portion thereof extends laterally from said first portion and above said corresponding container and terminates with a nozzle adapted to discharge high-pressure liquid; and
a means for releasing said stored compressed air, to cause at least a portion of the liquid volume introduced into the first container to be pneumatically propelled via said angled conduit and said nozzle until impinging upon blades of the turbine to produce power, wherein the turbine is located a flow path of the high-pressure liquid discharged from said nozzle.

10. The system of claim 9, further comprising means for storing a volume of compressed air with respect to each of the first and second containers.

11. The system of claim 10, wherein the means for storing a volume of compressed air with respect to each of the first and second containers comprises
a compressor;
an air tank in fluid communication with said compressor, within which said compressed air at a desired pressure is storable; and
an air conduit in controllable fluid communication with an interior of a corresponding one of each of the first and second containers and of said air tank, so that the introduced liquid is pneumatically propellable to the nozzle upon setting said air conduit in fluid communication with the interior of the corresponding container.

12. The method of claim 7, wherein the first and second containers are also thermally insulated for retaining heat that is generated during air compression.

13. A hydraulic-pneumatic energy storage and recovery method, comprising:
providing first and second sealed containers;
introducing liquid into said first container;
storing a first volume of fluid energy with respect to said first container;
releasing said first volume of fluid energy, to cause at least a portion of the liquid introduced into said first container to be pneumatically propelled;
directing said at least a portion of the liquid from said first container to a turbine to produce power;
collecting, externally to said first and second containers, energy-depleted liquid from said turbine;
delivering said energy-depleted liquid to said second container;
storing a second volume of fluid energy with respect to said second container;
releasing said second volume of fluid energy, to cause at least a portion of the liquid introduced into said second container to be pneumatically propelled; and
directing said at least a portion of the liquid introduced into said second container from said second container to said turbine to produce power;
wherein during said delivering, said second container is sealed such that the delivering causes an increase in pressure in said second container.

14. The method of claim 13, wherein the first and second containers are also thermally insulated for retaining heat that is generated during air compression.

15. The method of claim 13, wherein the introduced liquid is pneumatically propellable by a volume of stored compressed air that is in communication with and generatable with respect to each of the first and second containers.

16. The method of claim 15, further comprising:
an angled conduit introduced into each of the first and second containers, such that a first portion thereof extends downwardly into an interior of a corresponding container and a second portion thereof extends laterally from said first portion and above said corresponding container and terminates with a nozzle adapted to discharge high-pressure liquid; and
releasing said volume of stored compressed air, to cause said least a portion of the liquid to be pneumatically propelled via said angled conduit and said nozzle until impinging upon blades of the turbine to produce power, wherein the turbine is located a flow path of the high-pressure liquid discharged from said nozzle.

17. The method of claim 13, wherein said collecting said energy-depleted liquid is into a receptacle for receiving the energy-depleted liquid discharged from the turbine and a pump delivers pressurized liquid from said receptacle into an interior of a corresponding container of the first and second containers.

18. The method of claim 13, wherein increased temperature of the compressed air due to the compressing is transferred to the liquid influxing into the container.

* * * * *